United States Patent
Balogh et al.

(10) Patent No.: US 11,693,422 B2
(45) Date of Patent: Jul. 4, 2023

(54) SENSOR ARRAY FOR AN AUTONOMOUSLY OPERATED UTILITY VEHICLE AND METHOD FOR SURROUND-VIEW IMAGE ACQUISITION

(71) Applicant: KNORR-BREMSE SYSTEME FUER NUTZFAHRZEUGE GMBH, Munich (DE)

(72) Inventors: Levente Balogh, Szigetszentimiklos (HU); Huba Nemeth, Budapest (HU); Csaba Horvath, Biatorbagy (HU); Viktor Tihanyi, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 113 days.

(21) Appl. No.: 17/365,471

(22) Filed: Jul. 1, 2021

(65) Prior Publication Data

US 2021/0325897 A1    Oct. 21, 2021

Related U.S. Application Data

(63) Continuation of application No. 16/329,290, filed as application No. PCT/EP2017/070720 on Aug. 16, 2017, now Pat. No. 11,086,333.

(30) Foreign Application Priority Data

Sep. 8, 2016   (DE) ................ 10 2016 116 859.9

(51) Int. Cl.
   *G05D 1/02*      (2020.01)
   *B60R 1/00*      (2022.01)
   *G01S 13/931*    (2020.01)

(52) U.S. Cl.
   CPC ............ *G05D 1/0246* (2013.01); *B60R 1/00* (2013.01); *G01S 13/931* (2013.01);
   (Continued)

(58) Field of Classification Search
   CPC ............ G05D 1/0246; G05D 1/0257; G05D 2201/0213; B60R 1/00; B60R 2300/105;
   (Continued)

(56) References Cited

U.S. PATENT DOCUMENTS 9,082,315 B2 *  7/2015  Lin .................. G09B 19/167
9,164,511 B1   10/2015  Ferguson et al.
   (Continued)

FOREIGN PATENT DOCUMENTS

CN   102795223 A   11/2012
CN   103098112 A    5/2013
   (Continued)

OTHER PUBLICATIONS

Anonymous: Volvo Presents System for Integrating Autonomous Cars into Traffic: GPS World, Feb. 23, 2015, URL: http://gpsworld.com/volvo-presents-system-for-integrating-autonomous-cars-into-traffic.
(Continued)

*Primary Examiner* — Peter D Nolan
*Assistant Examiner* — Wae L Louie
(74) *Attorney, Agent, or Firm* — Norton Rose Fulbright US LLP; Gerard Messina (57) ABSTRACT

A sensor apparatus for an autonomously operated commercial vehicle to allow panoramic capture of surroundings of the commercial vehicle, including: radar units mountable in front corner areas of the vehicle; downwardly directed cameras having a fisheye objective, mountable on front upper corner areas of the vehicle; at least one rearwardly directed sensor mounted on a section of the vehicle to allow
(Continued)

rearward image capture; and an evaluation module to evaluate image data from the radar units, the downwardly directed cameras and the at least one rearwardly directed sensor to achieve the panoramic capture of the surroundings of the vehicle; in which the radar units and the at least one rearwardly directed sensor capture all points in a surrounding area of the vehicle, and wherein the downwardly directed cameras capture all points in the surrounding area of the vehicle. Also described are a related commercial vehicle, method and computer readable medium.

13 Claims, 10 Drawing Sheets (52) U.S. Cl.
CPC ...... *G05D 1/0257* (2013.01); *B60R 2300/105* (2013.01); *B60R 2300/301* (2013.01); *G01S 2013/93271* (2020.01); *G05D 2201/0213* (2013.01)

(58) Field of Classification Search
CPC ............. B60R 2300/301; G01S 13/931; G01S 2013/93271
See application file for complete search history.

(56) References Cited

U.S. PATENT DOCUMENTS

| | | | |
|---|---|---|---|
| 9,679,359 B2* | 6/2017 | Huebner | B60R 1/00 |
| 9,958,379 B1* | 5/2018 | Zhu | G01S 7/4808 |
| 9,986,154 B2* | 5/2018 | Chen | G06T 15/00 |
| 11,086,333 B2* | 8/2021 | Balogh | G01S 13/931 |
| 2008/0042812 A1* | 2/2008 | Dunsmoir | G06V 20/582 |
| | | | 348/148 |
| 2012/0262580 A1* | 10/2012 | Huebner | G08G 1/168 |
| | | | 348/148 |
| 2013/0147958 A1* | 6/2013 | Mitsuta | H04N 7/181 |
| | | | 348/148 |
| 2014/0247354 A1* | 9/2014 | Knudsen | G06T 7/85 |
| | | | 348/148 |
| 2014/0333729 A1* | 11/2014 | Pflug | G06T 7/80 |
| | | | 348/47 |
| 2015/0022664 A1* | 1/2015 | Pflug | G06F 3/04883 |
| | | | 348/148 |
| 2016/0044284 A1* | 2/2016 | Goseberg | G06F 3/012 |
| | | | 348/148 |
| 2018/0174327 A1* | 6/2018 | Singh | G06T 7/80 |
| 2018/0189574 A1* | 7/2018 | Brueckner | G06V 10/235 |
| 2018/0253608 A1* | 9/2018 | Diessner | G06V 10/44 |
| 2019/0004534 A1* | 1/2019 | Huang | G06F 18/251 |
| 2019/0004535 A1* | 1/2019 | Huang | G06N 3/045 |
| 2019/0018418 A1* | 1/2019 | Tseng | H04M 1/72415 |
| 2019/0080180 A1* | 3/2019 | Lyon | G06V 20/56 |
| 2019/0220034 A1* | 7/2019 | Balogh | G05D 1/0257 |
| 2019/0289282 A1* | 9/2019 | Briggs | G06T 7/593 |
| 2019/0324450 A1* | 10/2019 | Lurie | H04L 9/3236 |
| 2019/0325580 A1* | 10/2019 | Lukac | G06T 3/4038 |
| 2020/0134396 A1* | 4/2020 | Porta | G05D 1/0257 |
| 2020/0142032 A1* | 5/2020 | Chen | G01S 17/42 |
| 2020/0241549 A1* | 7/2020 | Tsurumi | G05D 1/0246 |
| 2021/0325897 A1* | 10/2021 | Balogh | B60R 1/00 |

FOREIGN PATENT DOCUMENTS

| | | |
|---|---|---|
| CN | 103583041 A | 2/2014 |
| CN | 104278907 A | 1/2015 |
| CN | 104391504 A | 3/2015 |
| CN | 104662592 A | 5/2015 |
| DE | 10035223 A1 | 1/2002 |
| DE | 69709810 T2 | 9/2002 |
| DE | 102004015749 A1 | 12/2004 |
| DE | 102010023199 A1 | 2/2011 |
| DE | 102010033774 A1 | 5/2011 |
| DE | 102011116169 A1 | 4/2013 |
| DE | 102014108684 A1 | 12/2015 |
| DE | 102014015075 A1 | 4/2016 |
| WO | 2015193158 A1 | 12/2015 |

OTHER PUBLICATIONS

International Search Report dated Nov. 14, 2017, of the corresponding International Application PCT/EP2017/070720 filed Aug. 16, 2017.

* cited by examiner

SENSOR ARRAY FOR AN AUTONOMOUSLY OPERATED UTILITY VEHICLE AND METHOD FOR SURROUND-VIEW IMAGE ACQUISITION

CROSS-REFERENCE TO RELATED APPLICATIONS

The present application is a continuation application of U.S. patent application Ser. No. 16/329,290, filed Feb. 28, 2019, which is a U.S. National Phase of International Application PCT/EP2017/070720, filed Aug. 16, 2017, and claims the benefit under 35 U.S.C. § 119 of German Patent Application No. DE 10 2016 116 859.9, filed on Sep. 8, 2016, all of which are hereby incorporated by reference in their entireties.

FIELD OF THE INVENTION

The present invention relates to a sensor arrangement for an autonomously operated commercial vehicle and to a method for panoramic image capture.

BACKGROUND INFORMATION

The autonomous operation of transport vehicles or other commercial vehicles is an area of increasing interest, wherein in particular applications for high-precision maneuvering of commercial vehicles are of interest. For this, the system architecture normally requires surroundings of the commercial vehicle to be capturable as completely as possible.

In comparison with a passenger vehicle, a commercial vehicle has special properties that need to be taken into consideration or that are associated with a high level of complexity of the underlying problem. In order to be able to efficiently capture the different areas in the surroundings of the commercial vehicle and in order to avoid collisions with objects, it is especially necessary for articulated connections between traction engines and trailers or the size of vehicle combinations (e.g. comprising a traction engine and a, sometimes long, trailer) to be borne in mind.

A typical instance of application in which commercial vehicles are meant to be operated autonomously with a high level of accuracy are loading stations at cargo terminals that are meant to be approached by the commercial vehicle, specifically typically from a rearward direction. The problem is aggravated further if additionally interfering objects can arise that can potentially impede safe maneuvering. As such, for example other vehicles, forklift trucks, people and cyclists can move at the cargo terminal and at least partially impede maneuvering.

Even if the applicable cargo terminals are restricted areas with clear rules and restricted access, reliable collision avoidance is a complex problem. In order to avoid collisions with objects unreservedly, an optimum sensor arrangement is required that permits 360° surroundings detection. This is not easy to implement, however, in view of the size and possible twisting of the commercial vehicles. Added to this is the fact that a driver or operator of the commercial vehicle often does not have complete discretionary powers over the traction engine and the trailer. For example, the trailer can have a different owner, which means that the driver or operator cannot simply make changes (e.g. attachment of cameras) to the trailer. Since additionally a traction engine frequently tows many, different trailers, it is desirable to alter the trailer as little as possible. There is thus a need to obtain a panoramic view without it being necessary to make any changes to the trailer. In this context, it is also necessary to take into consideration that a data connection between the traction engine and the trailer is frequently possible only to a restricted degree and high data rates are frequently not possible owing to proprietary definitions. For this reason too, sensors on the trailer are sometimes problematic.

A sensor arrangement for commercial vehicles for surroundings detection is discussed in DE 10 2014 108 684 A1, which presents a camera system, where sensors are placed on corner areas of the commercial vehicle. A further arrangement of cameras is discussed in US 2008042812 A1, which alerts the driver when an object is detected. Patent document DE 10 2010 033 774 A1 furthermore discusses a radar and camera arrangement that influences a driving profile in accordance with the detected objects. Additionally, DE 10 2004 015 749 A1 discusses a sensor arrangement for determining a vehicle path, wherein the vehicle has sensors on the front and rear.

These sensor arrangements are not believed to provide satisfactory solutions to the aforementioned problems, however. There is thus a need for further solutions.

At least some of the aforementioned problems are solved by sensor arrangements according to the descriptions herein and a method for panoramic image capture according to the description herein. The further descriptions herein define further advantageous embodiments.

The present invention relates to a first sensor arrangement for an autonomously operated commercial vehicle in order to allow panoramic capture of surroundings of the commercial vehicle. The first sensor arrangement comprises
- radar units mountable in front corner areas of the commercial vehicle,
- downwardly directed cameras having a (respective) fisheye objective, which are mountable on front upper corner areas of the commercial vehicle,
- at least one rearwardly directed sensor mountable on a section of the commercial vehicle (e.g. on the rear of the trailer or the traction engine) in order to allow rearward image capture, and
- an evaluation module.

The evaluation module is configured to evaluate image data from the radar units, the downwardly directed cameras and the at least one rearwardly directed sensor in order to achieve the panoramic capture of the surroundings of the commercial vehicle. The radar units and the at least one rearwardly directed sensor are configured to capture all points in a surrounding area of the commercial vehicle. Additionally, the downwardly directed cameras are configured to likewise capture all points in the surrounding area of the commercial vehicle.

By way of example, image data from the radar units and the at least one rearwardly directed sensor can be evaluated in order to produce a first panoramic image of the surroundings of the commercial vehicle. Additionally, image data from the downwardly directed cameras can be evaluated in order to produce a bird's eye view image as a second panoramic image of the surroundings of the commercial vehicle.

The surrounding area is meant to be a self-contained area around the vehicle that has a particular width (e.g. at least 50 cm, or approximately 1 m or else 2 m).

Within the framework of the present invention, a commercial vehicle is likewise meant to be understood to mean a vehicle combination (even if this is not always expressly mentioned). In particular, the commercial vehicle can thus be a traction engine with or without a trailer. The different cameras are configured (when mounted in appropriate fashion) to capture at least one image of surroundings of the respective mounting point. A panoramic image is meant to be understood to mean what may be 360° capture around the commercial vehicle.

A fisheye objective (having at least one fisheye lens) means an optical element that allows image capture up to a hemisphere or more. Within the framework of the present invention, the fisheye objective is configured to capture an image area that allows double coverage. If for example the cameras can further be mounted higher, the captured image area can also be chosen to be somewhat smaller. By way of example, image capture with an aperture angle of at least 120° or at least 170° should be assumed.

The present invention also relates to a second sensor arrangement for an autonomously operated commercial vehicle in order again to allow panoramic capture of surroundings. The second sensor arrangement comprises
  downwardly directed cameras having a fisheye objective, which are placeable along a perimeter of the commercial vehicle, and
  an evaluation module.
The evaluation module is configured to evaluate image data from the downwardly directed cameras in order to achieve the panoramic capture of the surroundings of the commercial vehicle. The downwardly directed cameras are configured to capture each point in a surrounding area of the commercial vehicle by two different cameras.

By way of example, image data from the downwardly directed cameras can be evaluated and a first panoramic image and a second panoramic image can be produced therefrom. Each panoramic image is then a bird's eye view image of the surroundings of the commercial vehicle.

It goes without saying that the downwardly directed cameras or the mounting locations thereof on the commercial vehicle cannot be chosen at random. As such, the range for the image capture of the cameras and the mounting location need to be coordinated with one another (in order to achieve an overlap during image capture). Since all (relevant) points in surroundings of the commercial vehicle are meant to be captured twice, the multiplicity of cameras can be divided into a first and a second set of cameras, with the first set producing the first panoramic image and the second set producing the second panoramic image. The first and second panoramic images therefore show the points from the surroundings from two different perspectives.

The present invention also relates to a third sensor arrangement for an autonomously operated commercial vehicle in order to allow further panoramic capture of surroundings. The third sensor arrangement comprises
  radar units mountable in a front corner area of the commercial vehicle;
  first downwardly directed cameras having a fisheye objective, which are mountable on front upper corner areas of the commercial vehicle;
  further cameras mountable in front upper corner areas of the commercial vehicle and allowing rearward image capture;
  second downwardly directed cameras having a fisheye objective, which are mountable on rear upper corner areas of the commercial vehicle, or at least one rearwardly directed sensor mountable on a rear of the commercial vehicle; and
  an evaluation module.
The evaluation module is configured to evaluate image data from the radar units and image data from the first and second downwardly directed cameras and image data from the at least one rearwardly directed sensor or the at least one rearwardly directed sensor in order to achieve the panoramic capture of the surroundings of the commercial vehicle. The radar units, the first and second downwardly directed cameras, the at least one rearwardly directed sensor or the at least one further sensor are configured to capture each point in a surrounding area of the commercial vehicle twice from different viewing angles (at the same time).

By way of example, image data from the radar units and image data from the first and second downwardly directed cameras and image data from the further cameras and/or the at least one rearwardly directed sensor can be evaluated in order to produce a first panoramic image and a second panoramic image of the commercial vehicle. The first panoramic image is based for example on image data of a radar unit on a first vehicle side and image data from cameras or sensors on a second, opposite vehicle side. The second panoramic image is based for example on the image data of a radar unit on the second vehicle side with image data from cameras or sensors on the first vehicle side.

The third sensor arrangement therefore provides the option for sensors/cameras to be mounted only on the traction engine—but not on the trailer (or thereon only optionally).

The evaluation modules can be for example electronic devices intended for the defined purposes, or can be integrated in such a device. The evaluation modules can thus be any controller of the vehicle that, as a result of installed software, is configured to perform the applicable functions.

It goes without saying that the dual capture of the surroundings of the commercial vehicle in the defined sensor arrangements is a restriction in terms of the number, type and placement of the individual cameras, sensors or radars, so that they are capable of achieving the dual capture of the surroundings.

Optionally, the second sensor arrangement can further have the following components: at least one radar unit mountable in front corner areas of the commercial vehicle and/or at least one rearwardly directed sensor mountable on a section of the commercial vehicle in order to allow rearward image capture. The evaluation module of the second sensor arrangement can then further be configured to evaluate further image data from the radar units and/or from the at least one rearwardly directed sensor for the first and second panoramic images.

Optionally, the third sensor arrangement can further have the following components: at least one rearwardly directed sensor mountable on a section of the commercial vehicle in order to allow rearward image capture. The applicable evaluation module can then further be configured to evaluate further image data from the at least one rearwardly directed sensor for the first and second panoramic images.

Optionally, the radar units can have a first radar sensor in the left-hand front corner area, a second radar sensor in the right-hand front corner area and a third radar sensor in a front central position of the commercial vehicle. Optionally, the radar units are configured as wide angle radar or capture an angle range of at least 120°.

Optionally, the downwardly directed cameras having the fisheye objective can have the following cameras: first lateral cameras, second lateral cameras, third lateral cameras and fourth lateral cameras. The first lateral cameras are mountable on front corner areas of the traction engine, the second lateral cameras are mountable on rear corner areas of the traction engine, the third lateral cameras are mountable on rear corner areas of the trailer and the fourth lateral cameras are mountable along a respective side of the trailer.

The positions of the fourth lateral cameras can be chosen for example such that the capture area thereof overlaps the capture areas of the second lateral cameras and of the third lateral cameras.

Optionally, the sensor arrangements can have a further forwardly oriented radar unit or camera unit mountable in a front area of the commercial vehicle. The applicable evaluation modules (for the individual sensor arrangements) are then further configured to evaluate further image data from the one further forwardly oriented radar unit or camera unit for the first and second panoramic images. This forwardly oriented radar unit can be in particular long range in order to be able to detect objects in a front area (in the direction of movement of the commercial vehicle) in good time.

Optionally, the sensor arrangements can have further cameras mountable in front corner areas of the commercial vehicle and capturing a downwardly directed field of vision. The applicable evaluation modules are then further configured to evaluate further image data from the further cameras for the first and second panoramic images.

The at least one rearwardly directed sensor and the further sensor can optionally comprise one of the following components: a camera, a radar, a lidar and an ultrasonic sensor.

The applicable evaluation modules are optionally further configured to detect objects or marking information in the image data so as to control or monitor or graphically represent an approach toward an object or toward a building.

The applicable evaluation modules are optionally further configured to ascertain a distance from an object or a building or a piece of marking information and to slow down or stop the commercial vehicle when a predetermined distance is reached in order to avoid a collision. The effect that can be achieved by this is that the vehicle can be moved autonomously through a passage having less than 1 m tolerance.

The present invention also relates to a commercial vehicle having one of the sensor arrangements as have been described above. The commercial vehicle can in particular be operated in driverless fashion at a particular speed in a predetermined area or autonomously in a predetermined area.

The present invention also relates to a method for panoramic image capture of surroundings of a commercial vehicle operated autonomously in driverless fashion. The method comprises the steps of: evaluating image data from sensors (e.g. cameras, radar units, lidar units and ultrasonic units) of the first, second or third sensor arrangement, capturing all points in a surrounding area of the commercial vehicle, wherein each point in the surrounding area is captured by at least two different sensors mounted at different positions on the commercial vehicle.

Optionally, the method can produce a first and a second panoramic image of the commercial vehicle, wherein the first panoramic image shows points in the surroundings of the commercial vehicle from a different perspective than in the second panoramic image.

Exemplary embodiments of the present invention provide a solution to the cited problems by a sensor arrangement that comprises a multiplicity of sensors (or cameras) that allow autonomous operation of commercial vehicles and can prevent collisions with other objects. Exemplary embodiments allow maneuvering of the commercial vehicle relative to the objects or existing markings. In comparison with the known sensor arrangements, exemplary embodiments are advantageous, since they permit reliable detection of objects around commercial vehicles, specifically without blind spots arising even when cornering. Additionally, distance measurement is possible, since not just camera-based detectors are used. In particular, in exemplary embodiments, it is not necessary for the driver to be present in the vehicle. Rather, the commercial vehicle can be operated in driverless fashion. Envisaged dual coverage of all areas ensures that even if a sensor or a camera fails, reliable detection of objects is still possible at each points in the surroundings of the commercial vehicle.

The exemplary embodiments of the present invention will be better understood from the following detailed description and the accompanying drawings of the different exemplary embodiments, which, however, should not be understood so that they limits the disclosure to the specific embodiments, but rather merely serve for explanation and comprehension.

DETAILED DESCRIPTION

Figure 1:
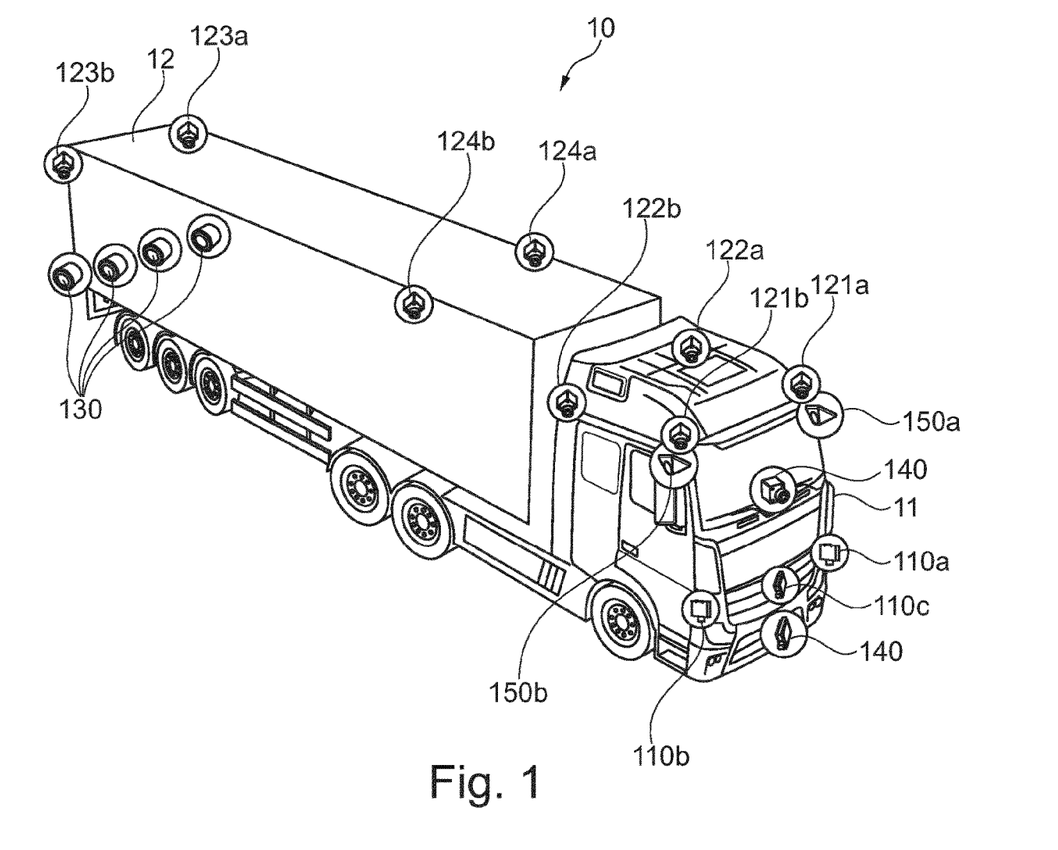
FIG. 1 shows a first sensor arrangement according to an exemplary embodiment of the present invention.

FIG. 1 shows an exemplary embodiment of a sensor arrangement suitable for being attached to a commercial vehicle 10. The commercial vehicle 10 comprises, by way of example, a traction engine 11 and a trailer 12. It goes without saying that the commercial vehicle 10 itself, neither the traction engine 11 nor the trailer 12, are necessarily part of the claimed subject matter. Rather, exemplary embodiments are meant to relate to the arrangement of the sensors with an applicable evaluation module in order to perform the defined functions.

In the exemplary embodiment shown in FIG. 1, radar units 110a, b, c are mounted in a front area of the commercial vehicle 10. The radar units 110 can be arranged for example on front corner areas of the traction engine 11 and in a central area, so that the radar units 110 permit capture both in the forward direction and in the lateral directions. It goes without saying that the radar unit 110c arranged in the center is optional, since this areas is capturable in principle on by the radar units 110a, b in the corner area if the field of vision of said radar units is chosen appropriately.

Additionally, the sensor arrangement comprises downwardly directed cameras 120 (121, . . . , 124) that have fisheye objectives and are mounted on upper corner areas of the commercial vehicle 10. It is thus possible for at least one image to be obtained from each mounting point (corner area). As a result, an image from the bird's eye view of the surroundings of the vehicle thus becomes producible. By way of example, first cameras 121a, b are arranged at front corner points of the traction engine 11, second cameras 122a, b are arranged at rear corner points of the traction engine 11, third cameras 123a, b are arranged on a rear area of the trailer 12 and fourth cameras 124a, b are arranged in a central area of the trailer 12. The cameras on the left-hand side are denoted by the addition "a" and the cameras on the right-hand side are denoted by the addition "b". It goes without saying that not necessarily all the cameras 120 shown need to be present. However, the arrangement depicted provides advantages, as are described below.

In the exemplary embodiment of FIG. 1, the vicinity to the front, to the left and to the right-hand side can be covered by the wide angle radar units 110 (110a, 110b, 110c). Additional coverage in these areas is provided by the downwardly directed cameras 120 (121, . . . , 124), which have a fisheye objective in order to capture a ground area from the upper corner points of the driver's cab of the traction engine 11. Ideally, these cameras 120 capture a 270° range of vision around the axis of each camera at the corner, so as to achieve complete coverage. This range of vision could also be chosen to be smaller, for example if further cameras are provided for in order to still achieve the desired dual coverage.

Further additional cameras 124 having fisheye objectives can be provided for on the lateral areas of the vehicle, since a range of vision of the cameras 120 arranged at the corners can be inadequate, for certain commercial vehicles 10, for complete lateral coverage of the vehicle 10 or of the vehicle combination 11, 12 (e.g. on account of its size). In general, the number of these cameras 120 is dependent on the size of the vehicle 10 or vehicle combination 11, 12 and is likewise dependent on possible blind spot ranges that can be produced by a turnable vehicle 10 or by decoupling of the different vehicle parts.

Additionally, the sensor arrangement comprises rearwardly directed sensors 130 mounted in a rear section of the commercial vehicle 10 or of the trailer 12 in order to allow rear image capture. The sensors 130 comprise, by way of example, one or more cameras or one or more radar units or one or more lidar units or one or more ultrasonic sensors or any combination of these. Therefore, the rear of the commercial vehicle 10 or of the vehicle combination 11, 12 can firstly be covered by sensors (rearwardly directed sensors 130) that permit good distance measurement. Secondly, it is also possible for cameras 123 having a fisheye objective to be placed there, specifically on upper corner areas, in order to allow additional coverage of this area.

Finally, the range of vision can be expanded further, in particular in a forwardly directed direction of vision in which the vehicle moves, specifically ordinarily at a higher speed than rearward, in order to detect relevant objects in good time. To this end, forwardly directed sensors 140 that permit forwardly directed image capture can be mounted on the traction engine 11. The forwardly directed sensors 140 comprise for example a camera and/or a radar, but in particular after forwardly directed long range radar units or else corner cameras. Optionally, in order to achieve range of vision expansion, the forwardly directed long range radar units or cameras 140 having sufficient coverage can be used.

Finally, in the exemplary embodiment of FIG. 1, rearwardly directed cameras 150 is mounted in upper corner areas of the traction engine 11 such that rearwardly directed detection of objects is made possible. By way of example, the rearwardly directed cameras 150 are arranged in the upper corner areas on the front of the traction engine 11.

FIGS. 2 to 5 illustrate the individual areas that can be captured by cameras, radar units, lidar units or ultrasonic units.

Figure 2:
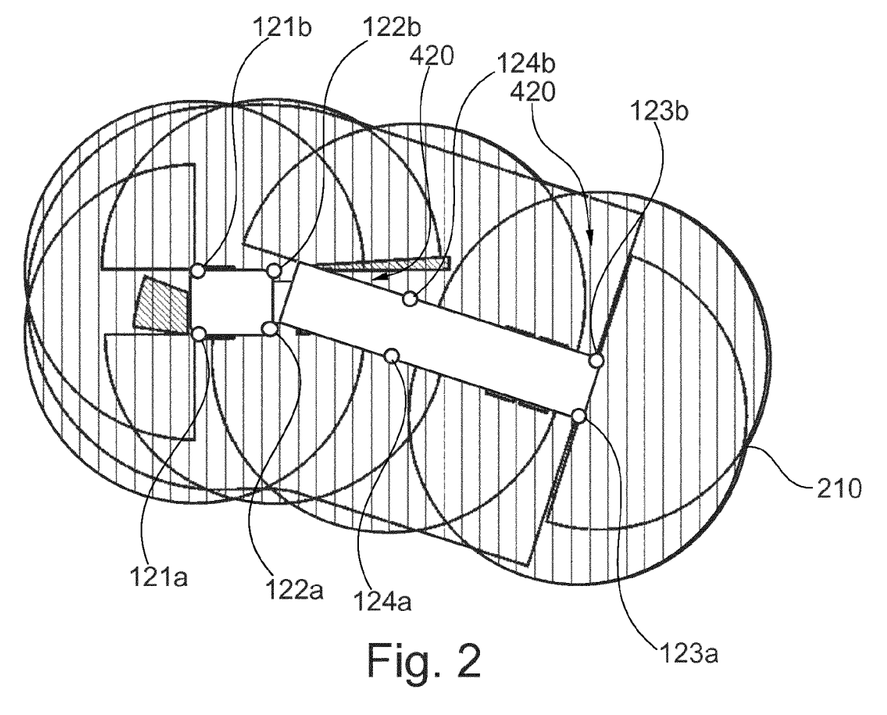
FIG. 2 shows coverage areas as a result of the downwardly directed cameras with fisheye lenses.

FIG. 2 depicts different areas 210 around the commercial vehicle 10 that are capturable by the downwardly directed cameras 120 (121, . . . , 124) with fisheye lenses. Overall, FIG. 2 depicts eight downwardly directed cameras 121a, . . . , 124b with a fisheye lens. The range of vision of each of these cameras 120 comprises a range of up to 270°, for example around a corner, or 180° for the cameras 124 arranged on the lateral points of the trailer 12 or on the rear corner points 122 of the traction engine 11. Each point in the surroundings of the traction engine 10 is covered by at least one camera as a result of the arrangement shown, the areas 420 being captured only by one camera.

Figure 3:
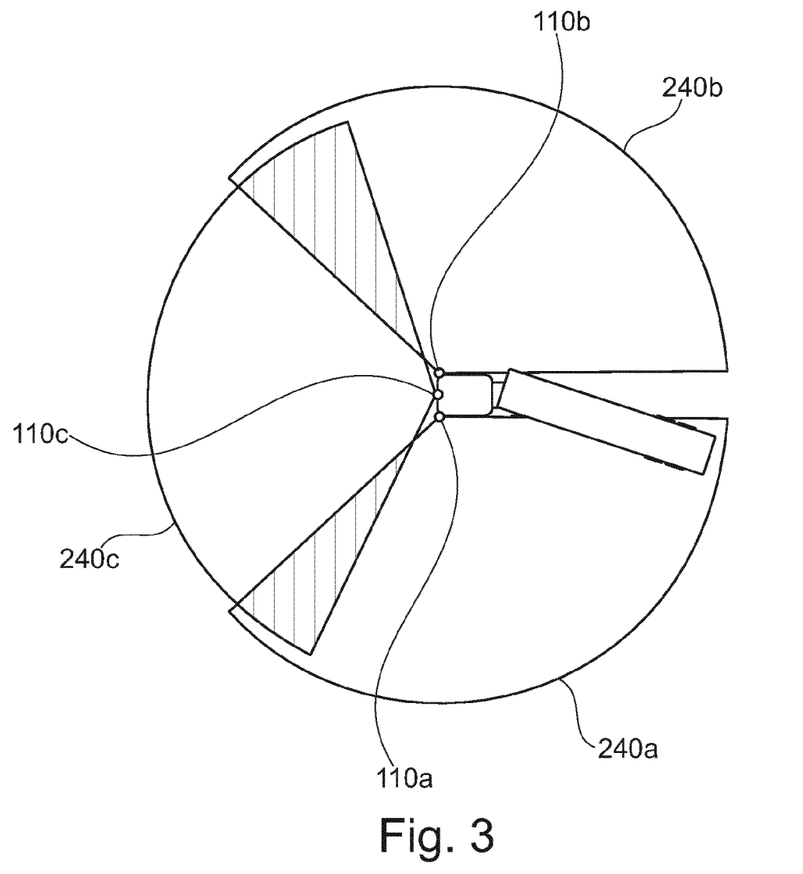
FIG. 3 shows coverage areas for the radar units.

FIG. 3 shows an analogous coverage for the radar units 110, which, by way of example, are configured to be on the traction engine 11. The respective radar units 110a, b on the corner areas of the traction engine 11 are, by way of example, oriented such that they cover the lateral area 240a, b and part of the front area, and the radar unit 110c, which is configured in a center of the traction engine 11, covers a front area 240c. The areas 240a, b, c of the radar units 110a, b, c at least partially overlap.

Figure 4:
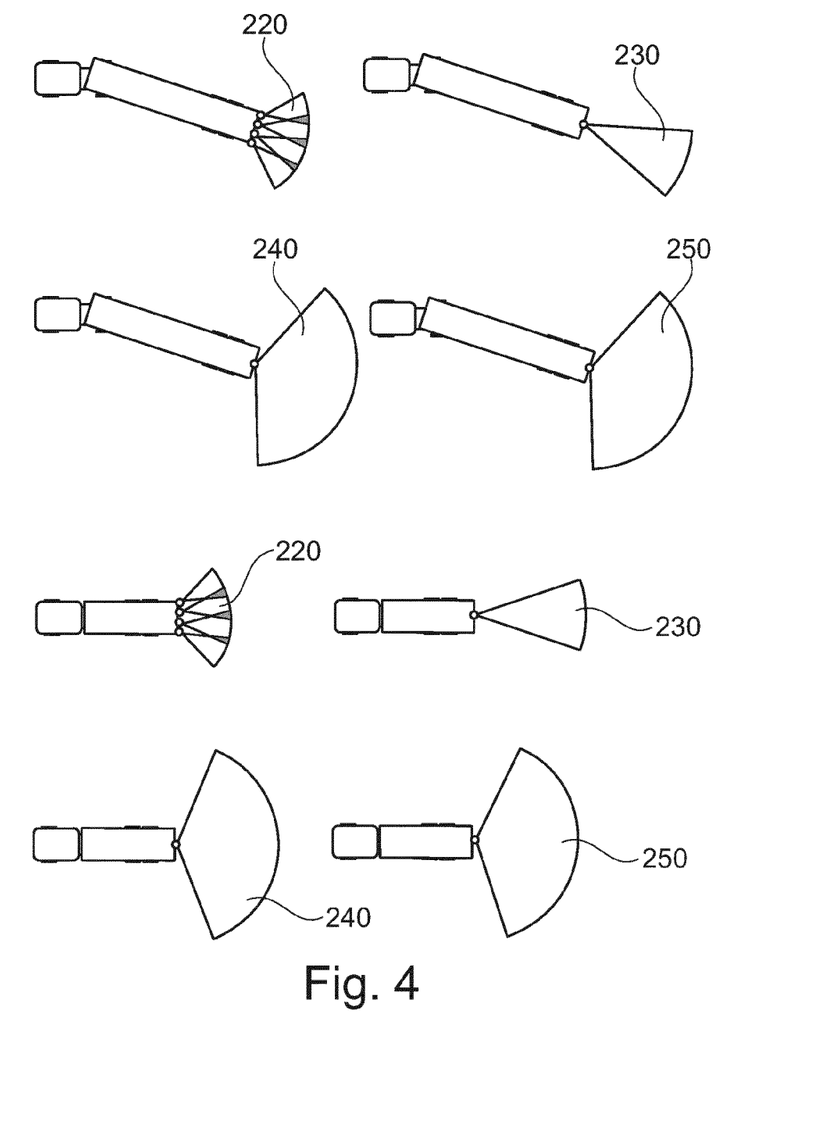
FIG. 4 shows coverage areas for the rearwardly directed sensors.

FIG. 4 shows possible coverage areas for the rearwardly directed sensors 130. These sensors can have for example one or more ultrasonic sensors that have a coverage 220. Additionally, these sensors can have a camera that has a coverage 230. Similarly, these sensors can have one or more radar units that have a coverage 240. These sensors can also have a lidar unit that has a coverage 250. The coverage areas at the top are shown for the case in which the commercial vehicle is traveling through a curve, and those at the bottom when the commercial vehicle is traveling straight on and the traction engine and the trailer are aligned.

Figure 5:
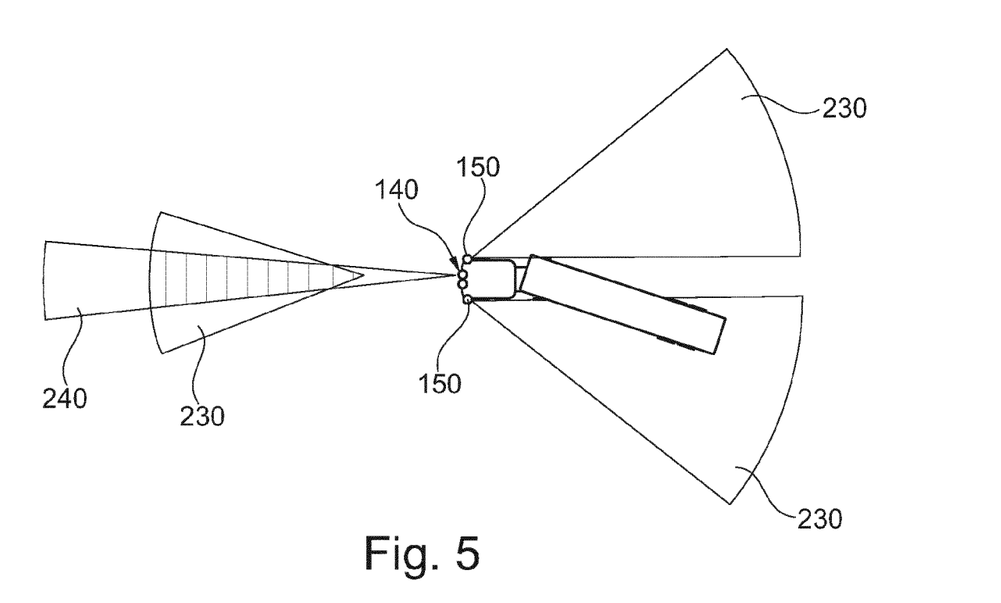
FIG. 5 shows a further exemplary embodiment, in which the field of vision is extended by further or specific configurations of the sensors/cameras.

FIG. 5 shows a further exemplary embodiment, in which the field of vision has been extended by additional or specific configurations of the sensors/cameras. By way of example, the forwardly directed radar and camera units 140 and the rearwardly directed right-hand and left-hand further cameras 150 on the traction engine have their range increased. As such, the radar unit 140 in the front area comprises a coverage 240, which is longer range than the coverage that can be seen in FIG. 3, for example. The same is true of a camera that can optionally additionally be configured to be on the traction engine 11 and has a coverage area 230 that is longer range than the coverage areas as can be seen in FIGS. 2 and 4, for example. Similarly, it is possible for the further rearwardly directed cameras 150 to be configured such that their range 230 is longer than the commercial vehicle as can be seen in FIG. 5.

Figure 6:
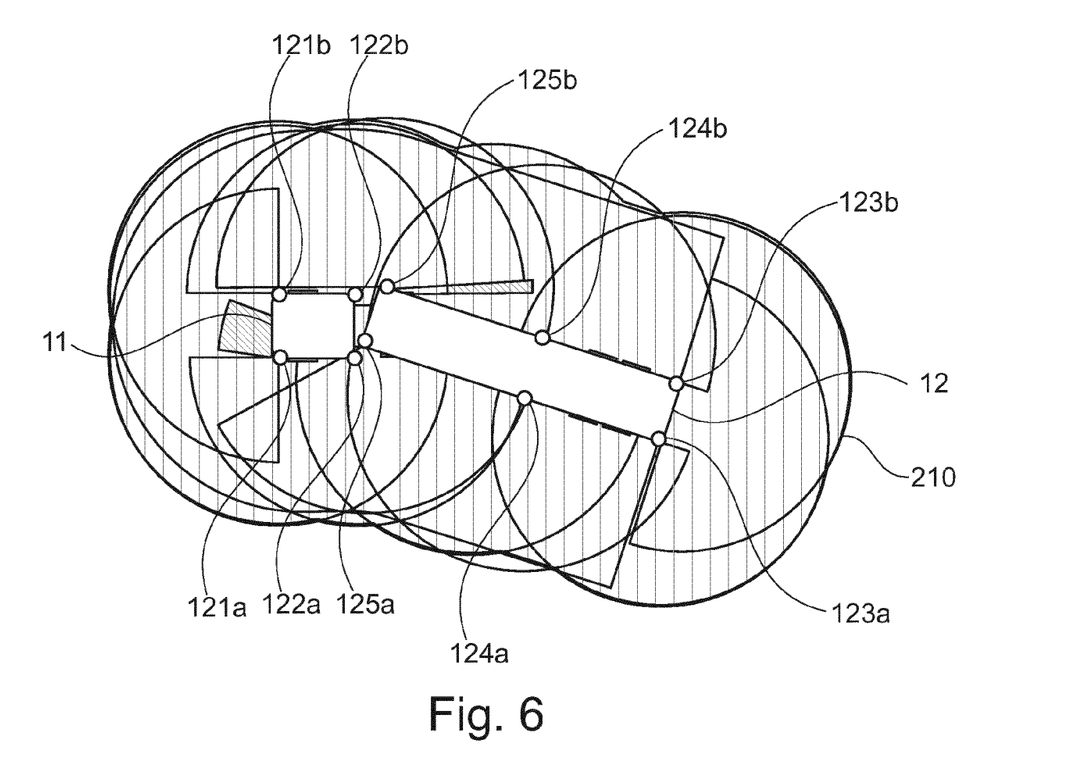
FIG. 6 shows a second sensor arrangement according to an exemplary embodiment of the present invention, in which the commercial vehicle is configured to have only downwardly directed cameras with a fisheye objective.

FIG. 6 shows an exemplary embodiment of a second sensor arrangement, in which the commercial vehicle is configured to have only downwardly directed cameras 120 having a fisheye objective. In this case, cameras 121, 122, 123, 125 having the fisheye objective are configured to be on the four corner areas of the traction engine 11 and on the four corner areas of the trailer 12. Furthermore, two downwardly directed cameras 12a, b having a fisheye objective are configured to be at a central position or approximate central position on each side of the trailer 12. This arrangement of downwardly directed cameras 120 allows each point in the surroundings of the commercial vehicle 10 to be captured by two respective cameras. Therefore, in particular also the areas 420 with simple coverage (see FIG. 2) are each captured using two cameras, which means that in the immediate surroundings of the vehicle 10 there is no area that is captured just by one camera. This is achieved by virtue of additional downwardly directed cameras 125a, b being configured to be on the front corner areas of the carrier 12 that each cover part of the area that is seen by the central cameras 124a, b, so that the central cameras 124a, b can be mounted further behind toward the rear end of the carrier 12, so that the range of said cameras projects over the end of the trailer.

In this exemplary embodiment, there are thus that no blind spots during image capture, which means that more reliable image capture is made possible. By way of example, a camera 120 can fail and every area around the vehicle is still capturable. Further, it becomes possible to use the dual image capture to produce a stereo image and therefore to permit determinations of distance, for example. In particular, the exemplary embodiment of FIG. 6 does not require additional radar systems or other sensors to be produced in order to achieve dual coverage of the surroundings of the vehicle. By way of example, in the exemplary embodiment of FIG. 6, no rearwardly directed sensors need to be configured to be on the rear wall of the trailer 12. Similarly, in the exemplary embodiment of FIG. 6, it is not necessary for forwardly directed radar or camera sensors to be attached to the traction engine, since the front area are likewise covered by the downwardly directed cameras 120 with a fisheye objective.

However, it is optionally possible to provide for additional radar and camera sensors in order again to allow range extension, in particular in a front area of the commercial vehicle (as shown in FIG. 5).

Figure 7:
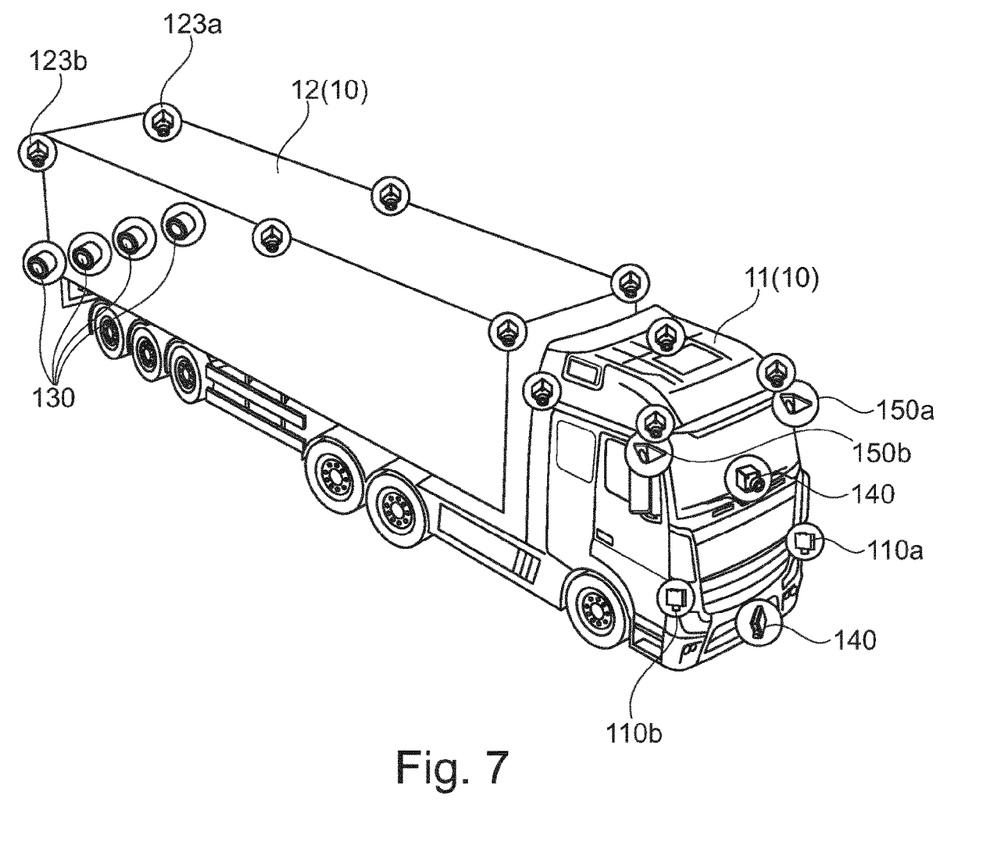
FIG. 7 shows an exemplary embodiment of the second sensor arrangement with additional, optional sensors.

FIG. 7 shows an exemplary embodiment in which these additional, optional sensors 110, 140, 150 are configured to be on the commercial vehicle 10. In particular, the additional sensors 110, 140, 150 are configured in the same way, as can be seen in FIG. 1, for example, with the ranges as depicted in FIGS. 2 to 5.

Therefore, the exemplary embodiment of FIG. 7 comprises, in addition to the downwardly directed cameras 121a, ..., 125b having a fisheye objective, optional rearwardly directed cameras 150a, b arranged on front corner areas of the traction engine 11. Additionally, optionally forwardly directed sensors 140 are configured to be on the traction engine 11. The forwardly directed sensors 140 can again comprise a camera and/or a radar unit, the range of which can be adapted according to requirements (see FIG. 5). Similarly, rearwardly directed sensors 130 are configured to be on a rear of the carrier 12. These rearwardly directed sensors 130 can again comprise a camera and/or a radar and/or a lidar and/or an ultrasonic sensor and have ranges as shown in FIG. 4. Optionally, the radar units 110a, 110b can likewise be configured to be on the front corner areas of the traction engine 11 and perform analogous functions as described in FIGS. 1 and 3.

Figure 8:
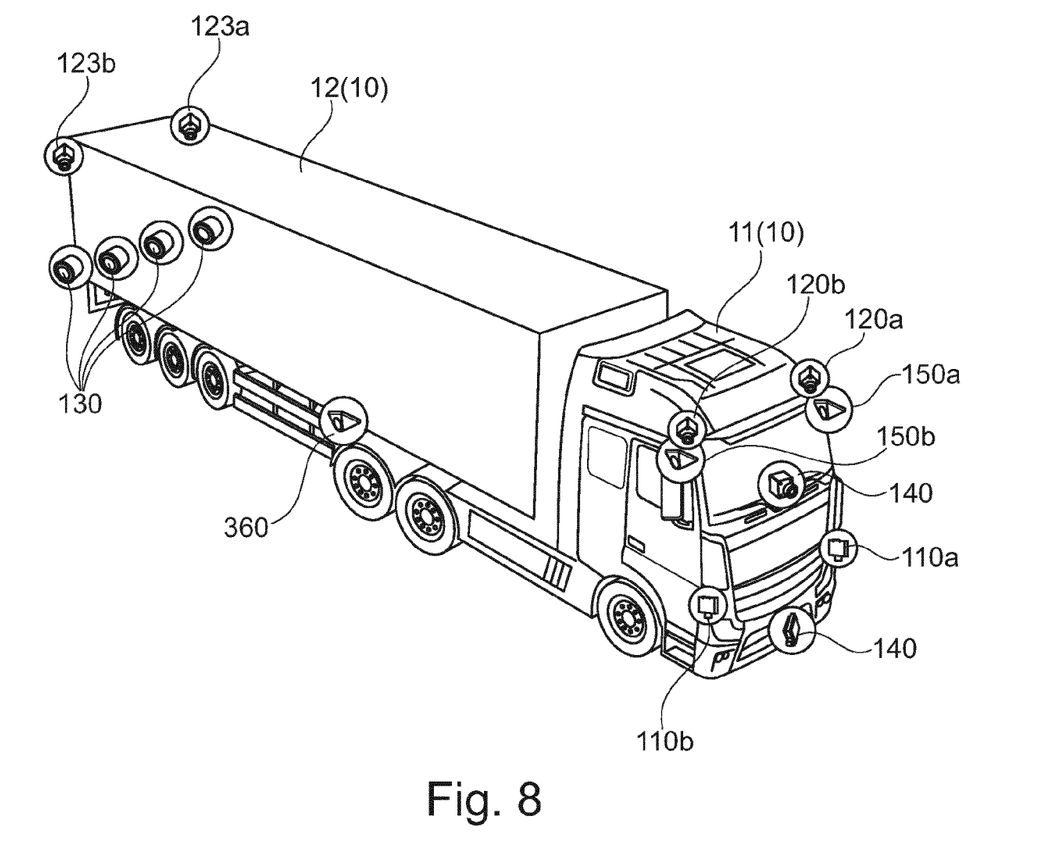
FIG. 8 shows a third sensor arrangement according to an exemplary embodiment of the present invention, in which as few sensors as possible are arranged on the trailer.

FIG. 8 shows an exemplary embodiment of a third sensor arrangement, in which as few sensors as possible need to be mounted on the trailer 12. This is advantageous because the trailer 12 can have a different owner than the traction engine 11, and a given traction engine 11 is meant to flexibly use or tow different trailers 12. Nevertheless, the exemplary embodiment of FIG. 8 allows dual coverage of all points in the surroundings to be achieved by overlapping capture areas in the local surroundings of the commercial vehicle 10. As such, the dual overlap is achieved in a front area by the downwardly directed cameras 120a, b with the fisheye objectives in the front corner areas of the traction engine. In the lateral area of the commercial vehicle 10, dual coverage is achieved by the radar units 110a, b with a wide angle capture area and rearwardly directed cameras 150a, b, which likewise together capture the lateral area in the same way as the cameras 120a, b configured to be on the corner areas.

In a rear area of the vehicle or of the vehicle combination 10, one of the following solutions is possible:
two downwardly directed cameras on a left-hand and upper corner of the vehicle or of the vehicle combination 123a, b or
rearwardly directed sensors 130, 360, such as a camera, a radar, an ultrasonic sensor or a set of sensors or a lidar.

Optionally, this exemplary embodiment also allows forwardly directed sensors 140 to be produced in order to achieve an increase in the coverage in the front area of the commercial vehicle 10. Furthermore, it is optionally possible, for a combination of traction engine 11 and trailer 12, to place the rearwardly directed sensors 130 (the camera, radar, lidar or ultrasonic sensors) on the rear of the traction engine 11, or to mount such sensors 130 in addition to those, rear sensors 360 placed on the trailer 12, in order to avoid a blind spot. Additionally, these sensors 360 can be used on the traction engine 11 in order to control a coupling between the traction engine 11 and the trailer 12.

Figure 9:
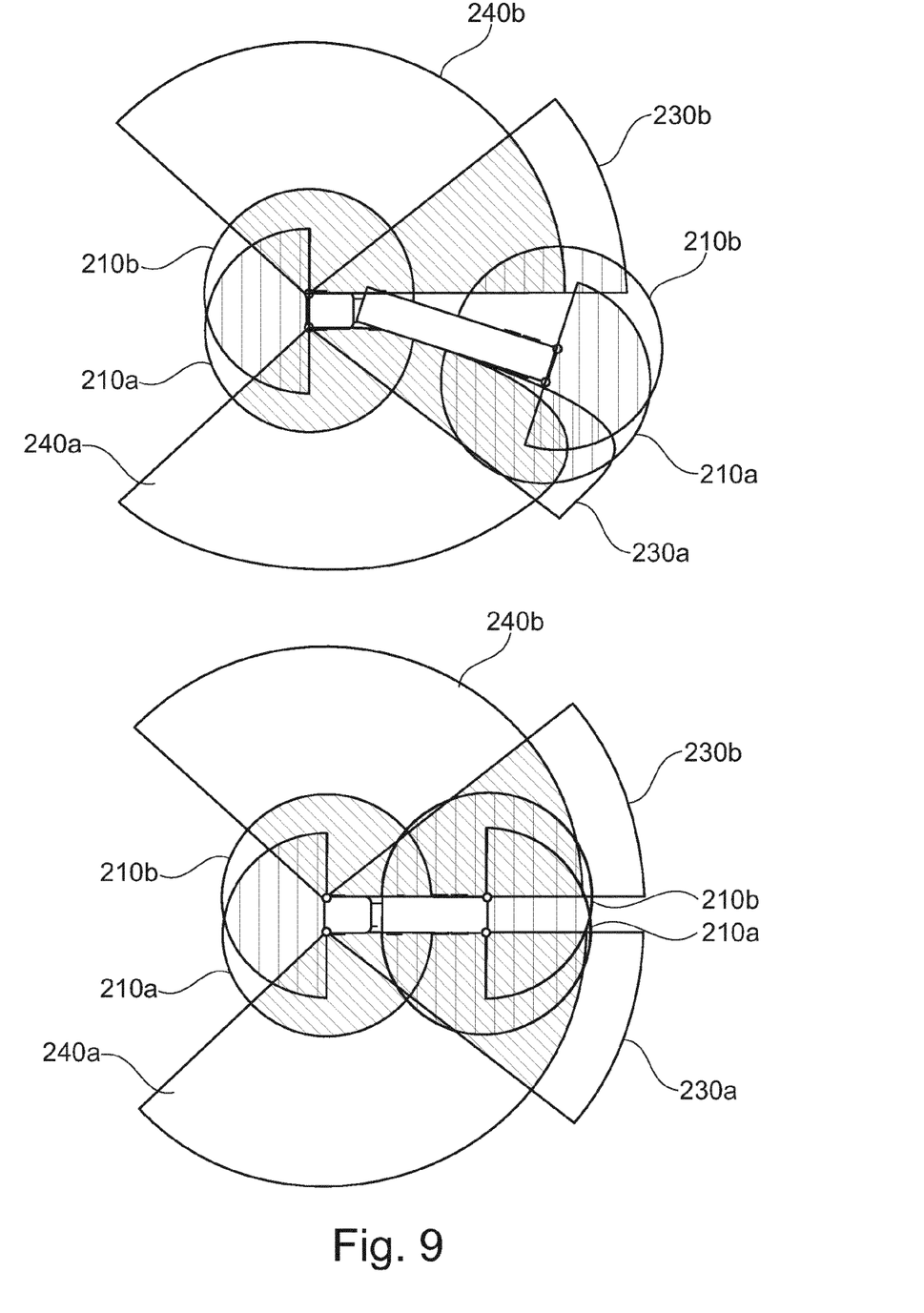
FIG. 9 illustrates the coverage of the third sensor arrangement from FIG. 8.

FIG. 9 again illustrates the coverage around the commercial vehicle 10 that becomes achievable as a result of the third sensor arrangement of FIG. 8, with one of the possible sensor types as described in connection with FIG. 4 being used on the rear. In this case, radar coverage areas 240 are again depicted overlapping coverage areas 210, 230 of different cameras 120, 360. A front area is covered twice in this case by the two fisheye cameras 120a, b on the corner areas. In a lateral area, dual coverage is provided by one of the fisheye cameras 120a, b and of the radar 110a, b, or of a rearwardly directed camera 360. The rear area of the commercial vehicle is covered twice by the fisheye cameras 123a, b as arranged on the rear corner areas of the trailer 12. The top of FIG. 9 in this case again shows the example when the vehicle combination 11, 12 is twisted, whereas the bottom of FIG. 9 shows the coverage of the case in which there is no twisting of the vehicle combination 11, 12.

Figure 10:
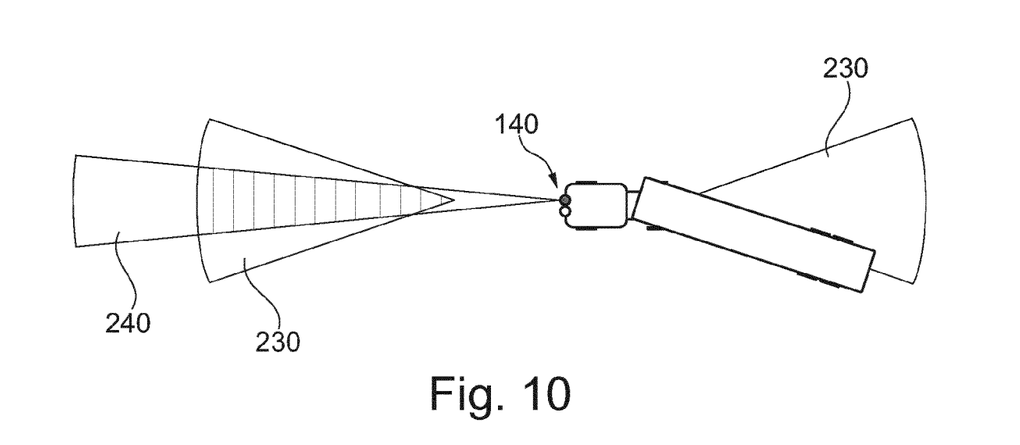
FIG. 10 shows an increase in of the coverage using optionally, further sensors.

FIG. 10 again shows an increase in the coverage using optional sensors (analogously to FIG. 5), forwardly directed sensors 140 again being able to be used that can comprise, by way of example, a camera having the camera area 230 and an optional radar unit having a radar area 240. A blind spot beside the towing vehicle can be ruled out for the use of an optional sensor 360 (see FIG. 8), which can likewise have a radar, a lidar or an ultrasonic sensor. Again, all options are possible for this exemplary embodiment, as have been described in connection with FIG. 4.

Exemplary embodiments of the present invention have the following advantages: the sensor arrangements make it possible to monitor surroundings of commercial vehicles with sufficient reliability and precision and to detect objects in said surroundings in order thus to allow a safe autonomous way of driving vehicles. In particular, each point around the vehicle 10 is reliably monitored within a predetermined minimum distance. The minimum distance can be a distance of 1 m or 2 m around the vehicle, for example. Additionally, it is possible to detect any unexpected object or a moving object approaching the vehicle. On the basis of that, the speed of the vehicle can be reduced or the vehicle can be stopped. An accident owing to a collision with a moving vehicle can be moved out.

The detection is typically limited by the range of the sensors or can be adjusted by increasing the range of the sensors according to requirements. By way of example, it may be necessary (on account of existing restrictions and guidelines) to limit the operation of autonomously operated commercial vehicles to restricted areas. This allows the vehicle to be maneuvered autonomously in particular within cargo terminals or loading stations, or allows the vehicle to be driven onto other transport, such as for example a train, a ferry or a road trailer.

The features of the invention that are disclosed in the description, the claims and the figures can be essential to the implementation of the invention either individually or in any combination.

THE LIST OF REFERENCE SIGNS IS AS FOLLOWS

10 Commercial vehicle
11 Traction engine
12 Trailer
110 Radar units
120,121a,121b,122a, . . . Downwardly directed cameras
130 Rearwardly directed sensors
140 Forwardly directed sensors
150a,b Further cameras (rearwardly directed)
210a,b Capture areas of downwardly directed cameras
220a,b Capture areas of ultrasonic sensors
230a,b Capture areas of cameras
240a,b Capture areas of radars
250 Capture areas of lidar sensors
360 Further sensors (rearwardly directed)

The invention claimed is:

1. A sensor arrangement for an autonomously operated commercial vehicle to allow panoramic capture of surroundings, comprising:
downwardly directed cameras having a fisheye objective, which are place-able along a perimeter of the commercial vehicle; and
an evaluation module to evaluate image data from the downwardly directed cameras to achieve the panoramic capture of the surroundings of the commercial vehicle;
wherein the downwardly directed cameras are configured to capture each point in a surrounding area of the commercial vehicle by two different cameras, wherein the surrounding area is a self-contained area around the vehicle,
wherein the commercial vehicle includes a traction engine and a trailer, wherein the downwardly directed cameras include first lateral cameras, second lateral cameras, third lateral cameras and fourth lateral cameras, wherein the first lateral cameras are mountable on front corner areas of the traction engine, the second lateral cameras are mountable on rear corner areas of the traction engine, the third lateral cameras are mountable on rear corner areas of the trailer and the fourth lateral cameras are mountable along a respective side of the trailer, and
wherein the multiplicity of cameras are divided into a first set of cameras and a second set of cameras, with the first set producing the first panoramic image and the second set producing the second panoramic image and therefore show the points from the surroundings from two different perspectives.

2. The sensor arrangement of claim 1, further comprising:
at least one radar unit mountable in front corner areas of the commercial vehicle; and/or
at least one rearwardly directed sensor mountable on a section of the commercial vehicle to allow rearward image capture;
wherein the evaluation module is configured to evaluate further image data from the radar unit and/or from the at least one rearwardly directed sensor for the panoramic capture.

3. The sensor arrangement of claim 1, wherein the radar units have a first radar sensor in the left-hand front corner area, a second radar sensor in the right-hand front corner area and a third radar sensor in a front central position of the commercial vehicle, wherein the radar units capture an angle range of at least 120°.

4. The sensor arrangement of claim 1, further comprising:
a further forwardly oriented radar unit or camera unit mountable in a front area of the commercial vehicle;
wherein the evaluation module is configured to evaluate further image data from the one further forwardly oriented radar unit or camera unit for the panoramic capture.

5. The sensor arrangement of claim 1, further comprising:
further cameras mountable in front corner areas of the commercial vehicle and capturing a downwardly directed field of vision;
wherein the evaluation module is configured to evaluate further image data from the further cameras for the panoramic capture.

6. The sensor arrangement of claim 1, wherein the at least one rearwardly directed sensor includes at least one of a camera, a radar, a lidar and/or an ultrasonic sensor.

7. The sensor arrangement of claim 1, wherein the evaluation module is configured to detect objects or marking information in the image data so as to control or monitor or graphically represent an approach toward an object or toward a building.

8. The sensor arrangement of claim 7, wherein the evaluation module is configured to ascertain a distance from an object or a building or a piece of marking information and to slow down or stop the commercial vehicle when a predetermined distance is reached to avoid a collision.

9. A sensor arrangement for an autonomously operated commercial vehicle to allow panoramic capture of surroundings, comprising:
radar units mountable in a front corner area of the commercial vehicle;
first downwardly directed cameras having a fisheye objective, which are mountable on front upper corner areas of the commercial vehicle;
further sensors mountable in front upper corner areas of the commercial vehicle and allowing rearward image capture;
second downwardly directed cameras having a fisheye objective, which are mountable on rear upper corner areas of the commercial vehicle, or at least one rearwardly directed sensor mountable on a rear of the commercial vehicle and allowing rearward image capture; and
an evaluation module to evaluate image data from the radar units and image data from the first downwardly directed cameras and image data from the further sensor and image data from the second downwardly directed cameras or the at least one rearwardly directed sensor to achieve the panoramic capture of the surroundings of the commercial vehicle;
wherein the commercial vehicle is a traction engine for a trailer, wherein the radar units, the first downwardly directed cameras, the further sensors, the second downwardly directed cameras or the at least one rearwardly directed sensor are configured to capture each point in a surrounding area of the commercial vehicle twice from different viewing angles, wherein the surrounding area is a self-contained area around the vehicle, wherein the evaluation unit is configured to produce a first panoramic image and a second panoramic image of the commercial vehicle, the first panoramic image is based on image data of a radar unit on a first vehicle side and image data from cameras or sensors on a second, opposite vehicle side, the second panoramic image is based for example on the image data of a radar unit on the second vehicle side with image data from cameras or sensors on the first vehicle side.

10. The sensor arrangement of claim 9, further comprising:

at least one rearwardly directed sensor mountable on a section of the commercial vehicle to allow rearward image capture;

wherein the evaluation module is configured to evaluate further image data from the at least one rearwardly directed sensor for the panoramic capture.

11. A commercial vehicle, which is operable in a driverless manner, comprising:

a sensor arrangement to allow panoramic capture of surroundings of the commercial vehicle, including:
radar units mountable in front corner areas of the commercial vehicle;
downwardly directed cameras having a fisheye objective, which are mountable on front upper corner areas of the commercial vehicle;
at least one rearwardly directed sensor mounted on a section of the commercial vehicle to allow rearward image capture; and
an evaluation module to evaluate image data from the radar units, the downwardly directed cameras and the at least one rearwardly directed sensor to achieve the panoramic capture of the surroundings of the commercial vehicle;
wherein the radar units and the at least one rearwardly directed sensor are configured to capture all points in a surrounding area of the commercial vehicle, and
wherein the downwardly directed cameras are configured to likewise capture all points in the surrounding area of the commercial vehicle.

12. A method for providing panoramic image capture of surroundings of a commercial vehicle operable autonomously in a driverless manner, the method comprising:

evaluating image data of a sensor arrangement, wherein the sensor arrangement allows the panoramic capture of the surroundings of the commercial vehicle, including:
radar units mountable in front corner areas of the commercial vehicle;
downwardly directed cameras having a fisheye objective, which are mountable on front upper corner areas of the commercial vehicle;
at least one rearwardly directed sensor mounted on a section of the commercial vehicle to allow rearward image capture; and
an evaluation module to evaluate image data from the radar units, the downwardly directed cameras and the at least one rearwardly directed sensor to achieve the panoramic capture of the surroundings of the commercial vehicle;
wherein the radar units and the at least one rearwardly directed sensor are configured to capture all points in a surrounding area of the commercial vehicle, and
wherein the downwardly directed cameras are configured to likewise capture all points in the surrounding area of the commercial vehicle; and
capturing all points in the surrounding area of the commercial vehicle, wherein each point in the surrounding area is captured by at least two different sensors mounted at different positions on the commercial vehicle.

13. A non-transitory computer readable medium having a computer program, which is executable by a processor, comprising:

a program code arrangement having program code for providing panoramic image capture of surroundings of a commercial vehicle operable autonomously in a driverless manner, by performing the following:
evaluating image data of a sensor arrangement, wherein the sensor arrangement allows the panoramic capture of the surroundings of the commercial vehicle, including:
radar units mountable in front corner areas of the commercial vehicle;
downwardly directed cameras having a fisheye objective, which are mountable on front upper corner areas of the commercial vehicle;
at least one rearwardly directed sensor mounted on a section of the commercial vehicle to allow rearward image capture; and
an evaluation module to evaluate image data from the radar units, the downwardly directed cameras and the at least one rearwardly directed sensor to achieve the panoramic capture of the surroundings of the commercial vehicle;
wherein the radar units and the at least one rearwardly directed sensor are configured to capture all points in a surrounding area of the commercial vehicle, and
wherein the downwardly directed cameras are configured to likewise capture all points in the surrounding area of the commercial vehicle; and
capturing all points in the surrounding area of the commercial vehicle, wherein each point in the surrounding area is captured by at least two different sensors mounted at different positions on the commercial vehicle.

* * * * *